United States Patent [19]
Foladare et al.

[11] Patent Number: 5,960,064
[45] Date of Patent: Sep. 28, 1999

[54] CALL SCREENING METHOD AND APPARATUS FOR USE IN COMPLETING TELEPHONE CALLS

[75] Inventors: Mark Jeffrey Foladare, Kendall Park; Shelley B. Goldman, East Brunswick; David Phillip Silverman, Somerville; Roy Philip Weber, Bridgewater, all of N.J.

[73] Assignee: AT&T Corp, Middletown, N.J.

[21] Appl. No.: 08/520,425

[22] Filed: Aug. 29, 1995

Related U.S. Application Data

[63] Continuation-in-part of application No. 08/264,651, Jun. 23, 1994, Pat. No. 5,546,442.

[51] Int. Cl.⁶ .................................................. H04M 1/64
[52] U.S. Cl. ...................... 379/88.26; 379/211; 455/413; 455/459
[58] Field of Search ................................ 379/67, 88, 89, 379/201, 211, 212, 57, 58

[56] References Cited

U.S. PATENT DOCUMENTS

| | | | |
|---|---|---|---|
| 5,471,519 | 11/1995 | Howe et al. | 379/221 |
| 5,511,111 | 4/1996 | Serbetcioglu et al. | 379/212 |
| 5,548,636 | 8/1996 | Bannister et al. | 379/201 |
| 5,566,236 | 10/1996 | MeLampy et al. | 379/201 |
| 5,588,037 | 12/1996 | Fuller et al. | 379/57 |

*Primary Examiner*—Fan S. Tsang

[57] ABSTRACT

A system and method for providing personal communications services are disclosed. A bridging and signaling unit implements a bridge for connecting telephone calls between a caller, a called party, and an alternate destination. A caller who calls the personal telephone number associated with a called party is held at the bridging and signaling unit while waiting for a return telephone call from the called party. The called party is alerted to the existence of the call through a paging system. If the time period during which the caller is on hold exceeds a timeout period, the caller will be connected to an alternate destination, such as a secretary, an answering service, or a voice messaging system. If the called party places the return telephone call while the caller is connected to the alternate destination, the called party will be connected to the caller and the alternate destination in such a manner that the called party can hear the conversation between the caller and the alternate destination, but the caller and the alternate destination cannot hear the called party and do not know that the called party has connected, i.e. the called party is on mute mode. After screening the call, the called party may then indicate that he/she wishes to be connected to the caller, at which time the connection to the alternate destination is terminated and the caller and the called party are connected such that they can speak with each other. If the called party does not wish to speak to the caller, he/she may hang up, and the connection between the caller and the alternate destination may continue.

21 Claims, 7 Drawing Sheets

CALL SCREENING METHOD AND APPARATUS FOR USE IN COMPLETING TELEPHONE CALLS

This application is a continuation-in-part of United States patent application Ser. No. 08/264,651 (docket no. Foladare 4-5-2-6-2-14) filed Jun. 23, 1994, now U.S. Pat. No. 5,546,442 issued Aug. 13, 1996 entitled "Method and Apparatus for Use in Completing Telephone Calls", which is hereby incorporated by reference.

FIELD OF THE INVENTION

The present invention relates to personal communications. More particularly, the present invention relates to a call screening method and apparatus for use in a system for setting up communications between a caller and a called party using a combination of paging and call bridging.

BACKGROUND OF THE INVENTION

One problem with setting up personal telecommunications connections today is the difficulty of locating called individuals. This problem is partially alleviated by mobile telephone technology and radio paging systems. In one system, described in copending United States patent application Ser. No. 08/424,825 (docket no. Miska 4-5) assigned to the same assignee as the present application, a caller who places a call to a called party is held at a "meet me bridge" in the telephone network. The called party is alerted to the existence of the telephone call placed to him/her by, for example, a paging system. The called party then initiates a telephone call to the bridge where the caller's telephone call is being held. The two calls may then be connected, or bridged, so that the called party can speak to the calling party.

One problem with such a system is that system delays in transmitting the paging signal and the time required to establish the return telephone call are often longer than most callers are willing to wait. Furthermore, not all pages will be successfully received nor will all page recipients be situated so as to be able to place return telephone calls. Therefore, to ensure that there is ultimately at least some communication between the calling and called parties, the calling party may be connected to an alternate destination if it is determined that the caller's telephone call cannot presently be connected to the called party, e.g., after a particular time period has passed and a return telephone call has not yet been received, or if the called party's telephone number is busy. The alternate destination may be, for example, a secretary, an answering service, or a voice messaging system. One problem with such a system is that, if the return telephone call is received after the caller's telephone call is connected to an alternate destination but before the caller terminates the call, the called party's return telephone call is nevertheless not connected to the caller's telephone call. This is so because the caller's telephone call is considered completed upon connection with the alternate destination.

Such a problem is overcome by the system described in copending United States patent application Ser. No. 08/264, 651 (docket no. Foladare 4-5-2-6-2-14) assigned to the same assignee as the present application. In that system, upon receipt of an indication that the called party is available for a caller's telephone call, e.g., receipt of a return telephone call, the caller's telephone call is disconnected from the alternate destination and, instead, is connected to the called party, e.g., to the called party's return telephone call. This system interrupts the connection between the caller and the alternate destination and connects the caller and the called party.

SUMMARY OF THE INVENTION

We have recognized that a called party, after placing the return telephone call, may not wish to be immediately connected to the caller. Thus, there is a need for a personal communications system which allows the called party to screen the caller's telephone call while the caller's telephone call is still connected to the alternate destination.

In accordance with the present invention, a system and method is provided such that a called party who is alerted to the existence of a telephone call to his/her personal telephone number can screen the call prior to being connected to the caller.

In accordance with the present invention, a caller who makes an originating telephone call to the personal telephone number of a called party, is held at an intermediate destination while waiting to be connected to the called party. The called party is alerted to the existence of the call, for example through a paging system, and may respond by placing a return telephone call to the intermediate destination. After the caller has been waiting for a certain timeout period, the caller will be connected to an alternate destination, e.g. a secretary, an answering service, or a voice messaging system. If the return telephone call is received after the timeout period and while the caller is connected to the alternate destination, the called party will be connected to the caller and the alternate destination such that the called party can hear the conversation between the caller and the alternate destination, but the caller and the alternate destination cannot hear the called party and do not know that the called party has connected, i.e. the called party is on mute mode. If the called party decides that he/she wishes to speak with the caller, he/she so indicates, e.g. by pressing a button on the telephone. In response to such an indication, the connection to the alternate destination is terminated and the caller and the called party are connected such that they can speak to each other. If the called party decides that he/she does not wish to speak with the caller, he/she can hang up and the call between the caller and the alternate destination will continue.

In one embodiment, if the return telephone call is received prior to the caller being connected to the alternate destination, the called party will be placed on hold until the timeout period has expired, at which time the caller and the called party will be connected to the alternate destination as described above. In another embodiment, the receipt of the return telephone call prior to the timeout period will initiate the connection to the alternate destination, thus reducing the hold time of the parties.

In yet another embodiment, where privacy laws permit, if the return telephone call is received prior to the caller being connected to the alternate destination, the called party may be connected to the intermediate destination and to the caller, with the called party in mute mode. At this point, the called party hears whatever the caller hears while waiting to be connected to the called party, e.g. music, and the called party also hears any sound originating at the caller. The called party may then indicate that he/she wishes to speak with the caller, in the manner described above. If the timeout period expires before such an indication, the caller and called party will be connected to the alternate destination as described above.

These and other advantages of the invention will be apparent to those of ordinary skill in the art by reference to the following detailed description and the accompanying drawings.

DETAILED DESCRIPTION

Figure 1:
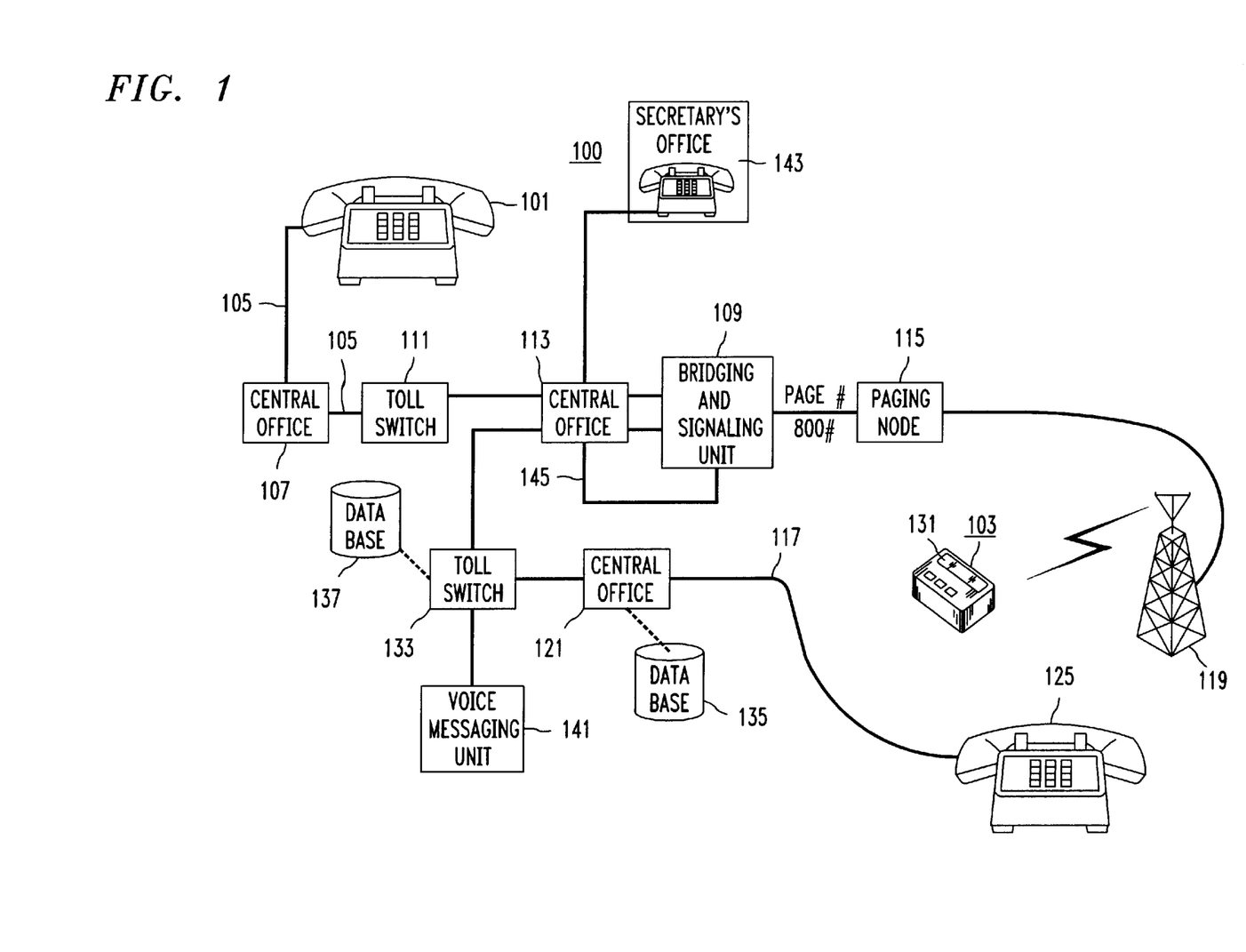
FIG. 1 shows an arrangement for providing telecommunications services in accordance with the principles of the invention.

FIG. 1 shows arrangement 100 for providing telecommunications services in accordance with the principles of the invention. A caller places a telephone call from calling telephone 101 to the personal telephone number of an individual associated with pager 103. The caller's telephone call passes over telephone line 105 to central office 107. Central office 107, in turn, routes the call to bridging and signaling unit 109, which is associated with the called number. Pager 103 is also associated with the called personal telephone number, as discussed further below.

Current United States telephone practices generally require that at least the one local exchange carrier (LEC), containing central office 107, routes the caller's telephone call. Also, the caller's telephone call may be routed via an inter-exchange carrier, represented by toll switch 111, and another local exchange carrier, represented by central office 113. Central offices 107 and 113 may be the same office. If so, the telephone call would not pass through any inter-exchange carrier or any other central offices. Other conventional arrangements of telecommunications carriers may be employed to route the callers'call to bridging and signaling unit 109.

Bridging and signaling unit 109 implements a so-called "meet-me bridge" for connecting at least two incoming telephone calls to each other. Upon receipt of the caller's telephone call, bridging and signaling unit 109 forwards paging information to paging node 115. The paging information includes a predetermined code that uniquely identifies the called individual's pager 103 and, if not predetermined, a telephone number to which a return telephone call must be placed in order to connect with, or "meet", the caller's telephone call. A copy of the predetermined code is stored within pager 103. Also, the telephone number for the return telephone call is reserved, in advance, for use by bridging and signaling unit 109. Its selection is described further below. Paging node 115 causes a paging signal containing the paging information to be broadcast from paging tower 119. Pagers and paging systems are well known in the art.

The telephone number of the return telephone call may be a translatable, e.g., 800-type, of telephone number. An advantage of using an 800-type of telephone number is that it allows the owner of pager 103 to place the return telephone call without having any information about the area code of the telephone line which he is using. This is because calls to 800-type telephone numbers are unlike calls to conventional telephone numbers. Telephone calls to conventional telephone numbers employ the area code for routing purposes. Such calls require the explicit dialing of the area code of the destination location for calls placed from one area code to another and that no area code be dialed for telephone calls placed within a single area code. However, 800-type telephone numbers employ the 800 area code to indicate that the telephone network should translate the telephone number to its corresponding destination location. As such, the 800 area code must always be dialed for such telephone calls to give this indication to the telephone network, even if the destination location is within the same area code as the location of the caller.

Pager 103 receives paging signals transmitted from paging tower 119. In the event that the code contained within the paging information of a paging signal matches the predetermined code stored in pager 103, pager 103 alerts. In response to the alerting by pager 103, the owner of pager 103 places a telephone call, which is the return telephone call, from telephone 125 to a particular telephone number which, if not predetermined, is specified in the page. As such, central office 121 receives the return telephone call and routes it to bridging and signaling unit 109. Central office 121 may route the call via an inter-exchange carrier, represented by toll switch 133, and another local exchange carrier, represented by central office 113. The routing of return telephone calls to 800-type telephone numbers follows well-known practices in the art for routing calls to 800-type telephone numbers. U.S. Pat. No. 4,191,860 issued to R. P. Weber on Mar. 4, 1980, describes one system for routing and translating 800-type numbers. The association of central office 121 with database 135 and toll switch 133 with database 137 aids in the routing process. It is noted that telephone 125 may be a mobile base telephone. If so, central office 121 is a mobile telephone switching office (MTSO).

In the event that the delay between the time the calling party connects to the bridging and signaling unit and the time the called party places the revertive telephone call and connects to the bridging and signaling unit exceeds a timeout period, e.g., 75 seconds, the calling party may be connected to an alternate destination. This will ensure that there is at least some communication between the caller and called individual. The components of this delay may include, for example, system delays in transmitting the paging signal; the time required by the individual associated with the pager to place the revertive telephone call; and the time to establish the revertive telephone call. The alternate destination may be, for example, telephone 143 at a secretary's office, an answering service (not shown) or voice messaging unit 141, which can be a conventional automated voice messaging system.

In accordance with the present invention, the called party can initiate a return telephone call from telephone 125 to bridging and signaling unit 109 without being immediately connected with the calling party. The return telephone call placed by the called party is called a revertive telephone call, and the telephone number to which the revertive call is placed is called the revertive telephone number.

In one embodiment, where privacy laws permit, if the called party places the revertive telephone call prior to the calling party being connected to the alternate destination, the revertive telephone call will connect to the calling party telephone call. However, this connection will be made such that sound originating at telephone 125 will not be transmitted to the caller at telephone 101, i.e., the revertive telephone call will be on mute. Thus the calling party will not know that the called party has connected and is listening. At this time, the called party will hear whatever the caller hears, e.g. music, while waiting for the called party to connect. In addition, the called party will hear anything the caller speaks into telephone 101. The called party may indicate that he/she wishes to speak to the caller by pressing a certain telephone key, thus generating a dual tone multi-frequency (DTMF) tone. Upon receipt of the tone the bridging and signaling unit 109 will remove the muting from the revertive telephone call and the two parties can speak to each other. If the called party does not press the appropriate key before the timeout period, the calling party will be transferred to the alternate destination as described above. At this point, the called party is still on mute, and will hear the conversation between the calling party and the alternate destination. The called party may again break in by pressing the appropriate key on the telephone. If the called party indicates that he/she wants to speak to the caller, the connection to the alternate destination will be disconnected, and the connection between the caller and the called party will be modified such that the revertive telephone call will be removed from mute. The calling party and the called party may then speak to each other. If the called party decides, after listening to the conversation between the calling party and the alternate destination, that he/she does not want to speak with the caller, the called party may hang up telephone 125. The calling party will continue to be connected to the alternate destination.

In a second embodiment, if the called party places the revertive telephone call prior to the calling party being connected to the alternate destination, the called party will be put on hold in the bridging and signaling unit 109 until the caller is connected to the alternate destination. Upon the caller being connected to the alternate destination, the called individual will be connected to the telephone call between the caller and the alternate destination in the manner described above. To reduce the time the parties are on hold, the bridging and signaling unit 109 can initiate the call to the alternate destination upon receipt of the revertive call, even if the timeout period has not yet expired.

Similarly, if the called party places the revertive telephone call after the caller has been connected to the alternate destination, the called individual will be connected to the telephone call between the caller and the alternate destination in the manner described above.

Figure 2:
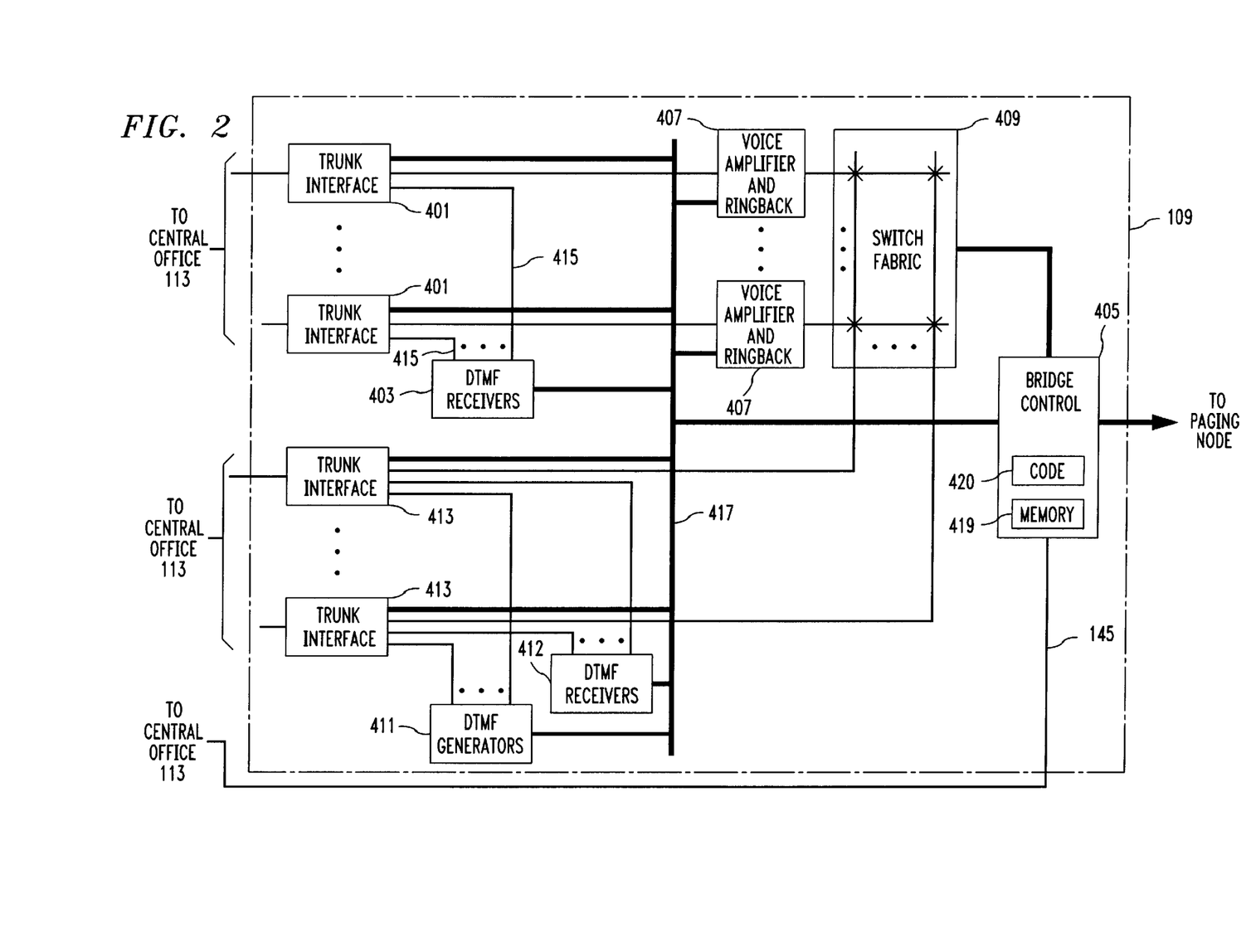
FIG. 2 shows, in block diagram form, an expanded view of the bridging and signaling unit shown in FIG. 1.

FIG. 2 shows, in block diagram form, an expanded view of bridging and signaling unit 109. Bridging and signaling unit 109 includes: a) trunk interfaces 401, b) dual tone multi-frequency (DTMF) receivers 403, c) bridge control 405, d) voice amplifier and ringback units 407, e) switch fabric 409, f) DTMF generators 411, g) trunk interfaces 413, and h) DTMF receivers 412. Bridge control 405 controls and coordinates the operation of bridging and signaling unit 109 by communicating commands and information over control bus 417.

A call placed by a caller to the personal number of an individual associated with pager 103 is received and terminated at bridging and signaling unit 109 by one of trunk interfaces 401. In one embodiment, the interface between central office 113 and trunk interfaces 401 is the same type of interface employed to connect a central office to a PBX equipped for direct inward dialing (DID). As part of terminating a call, central office 113 sends the last four digits of the personal telephone number to bridging and signaling unit 109 over the trunk. These digits are sent as DTMF signals. One of DTMF receivers 403 receives the DTMF signals over one of lines 415 and decodes them. It informs bridge control 405 at which of trunk interfaces 401 the telephone call arrived and the decoded four digits.

In response to the reception of the four decoded digits, bridge control 405 instructs one of voice amplifier and audible ring units 407 to supply a ringback tone over the one of trunk interfaces 401 at which the call arrived. Answer supervision is supplied so that an optional personal identification number (PIN) may be received from the caller. This optional PIN may be transmitted to pager 103 as part of the calling information. Since answer supervision is supplied, the caller is charged for the call from the time the answer supervision is supplied until the call is disconnected.

Bridge control 405 contains memory 419. Memory 419 maps the received four digits of the called individual's personal telephone number to the predetermined code stored in pager 103 associated with the called individual. Bridge control 405 selects an idle one of trunk interfaces 413 at which to receive the return telephone call. The trunks connecting central office 113 to trunk interfaces 413 are dedicated trunks and each has its own telephone number. Thereafter, bridge control 405 supplies to paging node 115 (FIG. 1) both the telephone number of the trunk associated with the selected idle one of trunk interfaces 413, as the number for the return telephone call, and the predetermined code of the called individual.

Upon receipt of a return telephone call at the selected one of trunk interfaces 413 within a timeout period, e.g., 75 seconds, bridge control 405 determines at which of trunk interfaces 401 is waiting the call of the caller that corresponds to this return telephone call. If the caller's telephone call is still waiting at trunk interface 401, bridge control 405 commands switch fabric 409 to interconnect the caller's telephone call with its respective return telephone call. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength.

In one embodiment of the invention, where privacy laws permit, if the revertive call is received prior to the caller being connected to the alternate destination, the called party may be connected to the caller in mute mode while the caller is on hold at the bridging and signaling unit 109. This allows the called party to hear voice originating at calling telephone 101, but the caller cannot hear voice originating at the called party's telephone 125. In this embodiment, the caller's telephone call and the respective return telephone call are bridged as described above, except that the bridge control 405 also commands the respective one of voice amplifier and ringback units 407 which is connected to the trunk interface 401 at which the caller's telephone call was received, to mute the voice originating from the revertive telephone call. Thus, bridge control 405 and the appropriate one of voice amplifier and ringback units 407 implement a muting circuit. It will be readily apparent to one skilled in the art that the embodiment shown in FIG. 2 implements a muting circuit through the combination of 1) software stored as code 420 and executed by bridge control 405, and 2) the voice amplifier and ringback unit 407 hardware. It will also be readily apparent to those skilled in the art that the same muting function can be accomplished through different combinations of hardware and software, including substantially in hardware and substantially in software.

If the called party wishes to, he/she may terminate the mute function by pressing a key on the telephone keypad to generate a DTMF tone. The appropriate one of DTMF receives 412, which is connected to the selected one of trunk interfaces 413 at which the return telephone call was received, receives the DTMF tone generated by the called party and sends an end mute signal to bridge control 405. Upon receipt of the end mute signal, the bridge control 405 sends a command to the respective one of voice amplifier and ringback units 407 to end the mute function. The caller and called party can then speak to each other over the bridged lines.

If a revertive telephone call is not received within the timeout period, bridge control 405 instructs an idle, and not presently selected to receive a return telephone call, one of trunk interfaces 413, to go off-hook and to seize a line. Next, one of DTMF generators 411 is connected to the seized line and commanded to dial the telephone number of an alternate destination selected in advance by the called party. This telephone number is stored in memory 419 in association with the four digits of the called individual's personal telephone number and predetermined code. The one of trunk interfaces 401 at which the caller's telephone call is waiting is then connected, i.e. bridged, to the one of trunk interfaces 413 from which the telephone call to the alternate destination is being placed via switch fabric 409 and one of voice amplifier and ringback units 407. Once the call originated from the one of trunk interfaces 413 is completed, the calling party may converse with a person, or leave a message, at the alternate destination.

If a revertive telephone call is received at the specified one of trunk interfaces 413 after the timeout but while the caller's telephone call is connected to the alternate destination, the called party may be connected to the calling party and the alternate destination such that the return call telephone line is in mute mode. In this manner, the called party can listen to the conversation between the caller and the alternate destination, but the caller and the alternate destination cannot hear the called party and do not know that the called party is on the line.

To accomplish this, the bridge control 405 upon receipt of information that the revertive call has arrived, commands switch fabric 409 to bridge the revertive call with both the calling telephone call and the alternate destination telephone call. Thus, the revertive telephone call at one of trunk interfaces 413 is connected to the trunk interface 401 at which the calling telephone call is located and to the trunk interface 413 at which the telephone call to the alternate destination is located. In addition, the bridge control 405 commands the appropriate voice amplifier and ringback unit 407 to mute the telephone line of the revertive call, thus implementing a muting circuit, as described above.

If the called party wishes to converse with the calling party, he/she may enter a DTMF tone, as described above, to signal the bridge control 405 to terminate the mute function. The bridge control 405 will command the appropriate one of voice amplifier and ringback units 407 to terminate the mute function. The bridge control 405 will then command the switch fabric 409 to terminate the connection to the trunk interface 413 from which the telephone call to the alternate location was originated. Optionally, prior to terminating the connection to the alternate destination, the bridge control 405 can command an appropriate one of DTMF generators 411 to generate a tone, indicating to the parties that the called party is now available. Such a function is particularly useful if the alternate destination is a connection to a person, e.g. telephone 143 in a secretary office.

In one embodiment of the invention, a called party will not be connected to the calling party in mute mode unless the caller has been connected to the alternate destination. Thus, if the revertive call is received while the caller is on hold in the bridging and signaling unit 109, the called party will also be put on hold in the bridging and signaling unit 109. It is not until the caller is connected to the alternate destination that the called party has the opportunity to screen the call. In this embodiment, in order to reduce the hold time, the call to the alternate destination may be initiated upon receipt of the revertive call, even if the timeout period has not yet expired.

FIGS. 3A–3E, when connected together, show a flow chart of an exemplary process for completing a telephone call placed to the personal number of a called individual associated with pager 103 (FIG. 1), in accordance with the principles of the invention. The process begins in step 300 when a caller decides to make a call to the individual associated with pager 103 using his personal number. To this end, in step 302, the caller dials the called individual's personal number at telephone 101 (FIG. 1). A telecommunications carrier routes the call to bridging and signaling unit 109 in step 304. Thereafter, in step 306, the telecommunications carrier supplies the called number and, if available, the calling number to bridging and signaling unit 109.

Figure 3A:
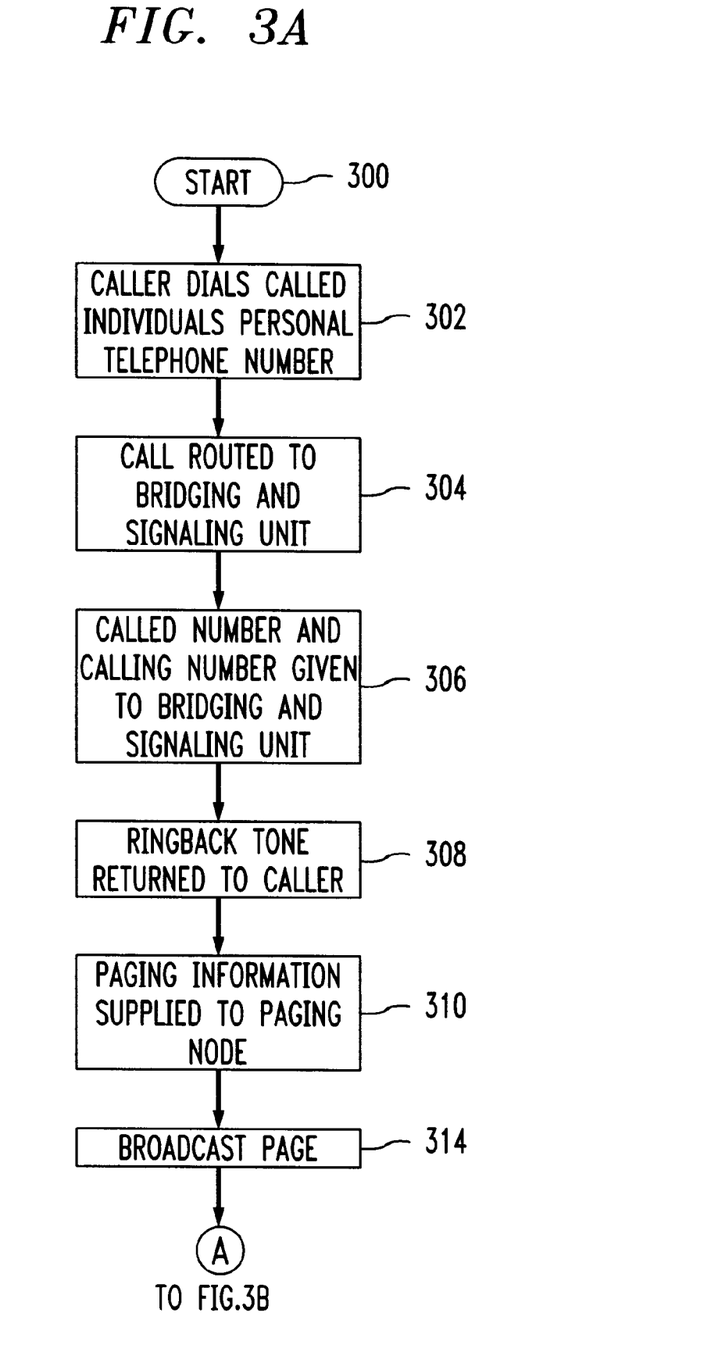
FIGS. 3A–3E, taken together, show a flow chart of a process for completing a telephone call placed to the personal number of an individual in accordance with the present invention.

In step 308, bridging and signaling unit 109 supplies ringback tone to telephone 101. Next, in step 310, bridging and signaling unit 109 sends to paging node 115 the paging information, i.e., the predetermined code of the called individual that is stored within pager 103 and, optionally, a) the telephone number to which the return telephone call must be made and b) an indication of the identity of the caller. In step 314, paging tower 119 broadcasts a paging signal that includes the paging information.

At this point, the caller is placed on hold in step 316. Optionally, the caller may be provided with music from the appropriate one of voice amplifier and ringback units 407 while the caller is waiting to be connected to the called party.

Figure 3B:
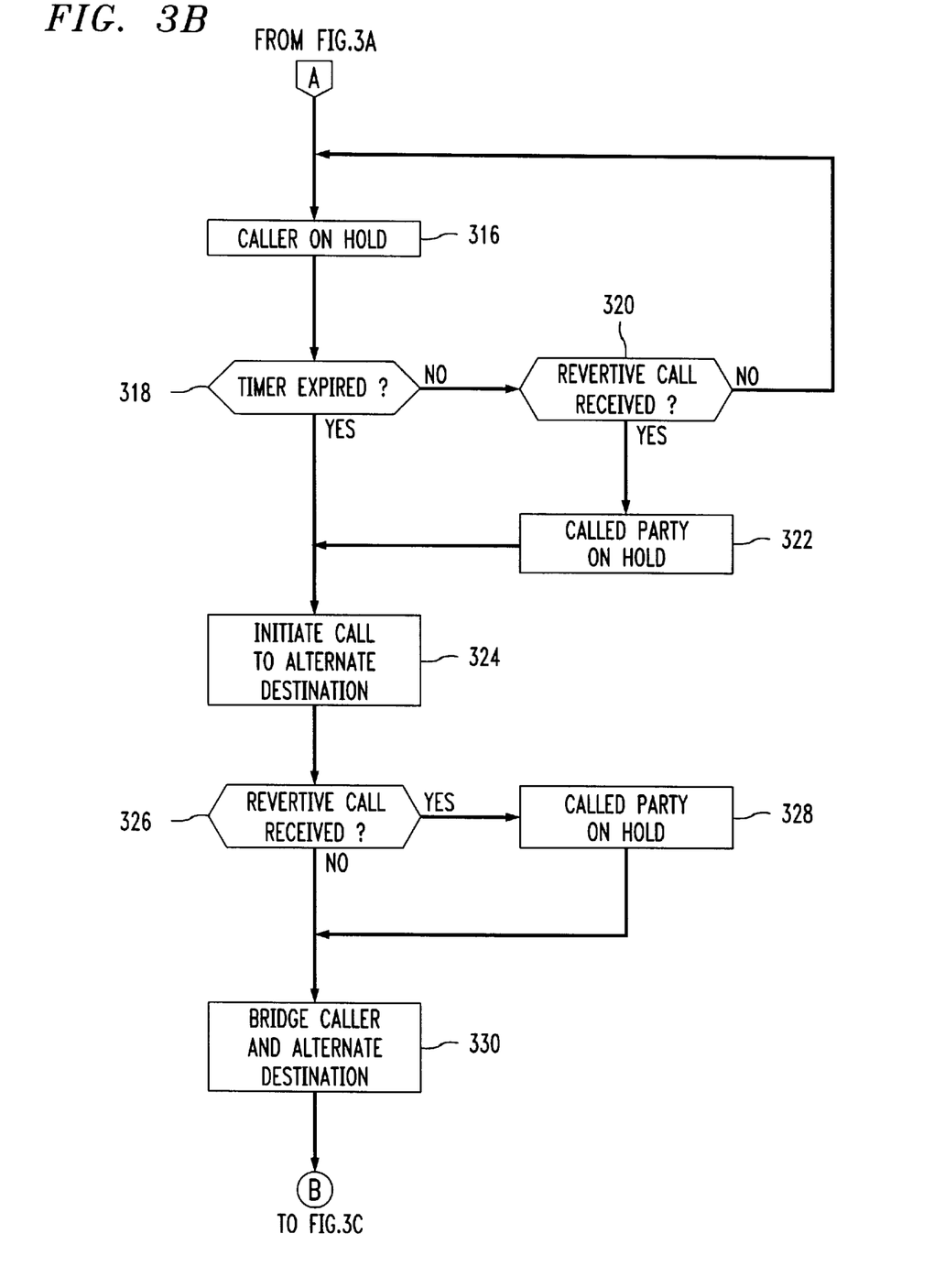

During this time, the called party's pager 103 will alert, and the paging information may be displayed on the pager display 131. The caller remains on hold for a period of time while waiting for the called party to place the revertive call. In step 318 it is determined whether the period of time has expired. If not, then the caller remains on hold and it is it determined in step 320 whether the called party has placed the revertive call. If not, then the caller remains on hold in step 316. If the called party has placed the revertive call, then the test of step 320 will be "yes" and the called party will be placed on hold in step 322. If the timer has expired, or if the revertive call has been received, the bridging and signaling unit 109 will initiate a call to the alternate destination in step 324. The telephone number of the alternate destination is stored in memory 419 of the bridging control 405 associated with the called party's personal telephone number. While the bridging and signaling unit 109 is connecting to the alternate destination, it is determined whether the revertive call has been received in step 326. If it has, then the called party is put on hold in step 328. In step 330, the caller and the alternate destination are bridged. At this point, the caller may talk with the alternate destination. As discussed above, the alternate destination may be, for example, a telephone 143 at a secretary's office, an answering service or voice messaging unit 141.

Figure 3C:
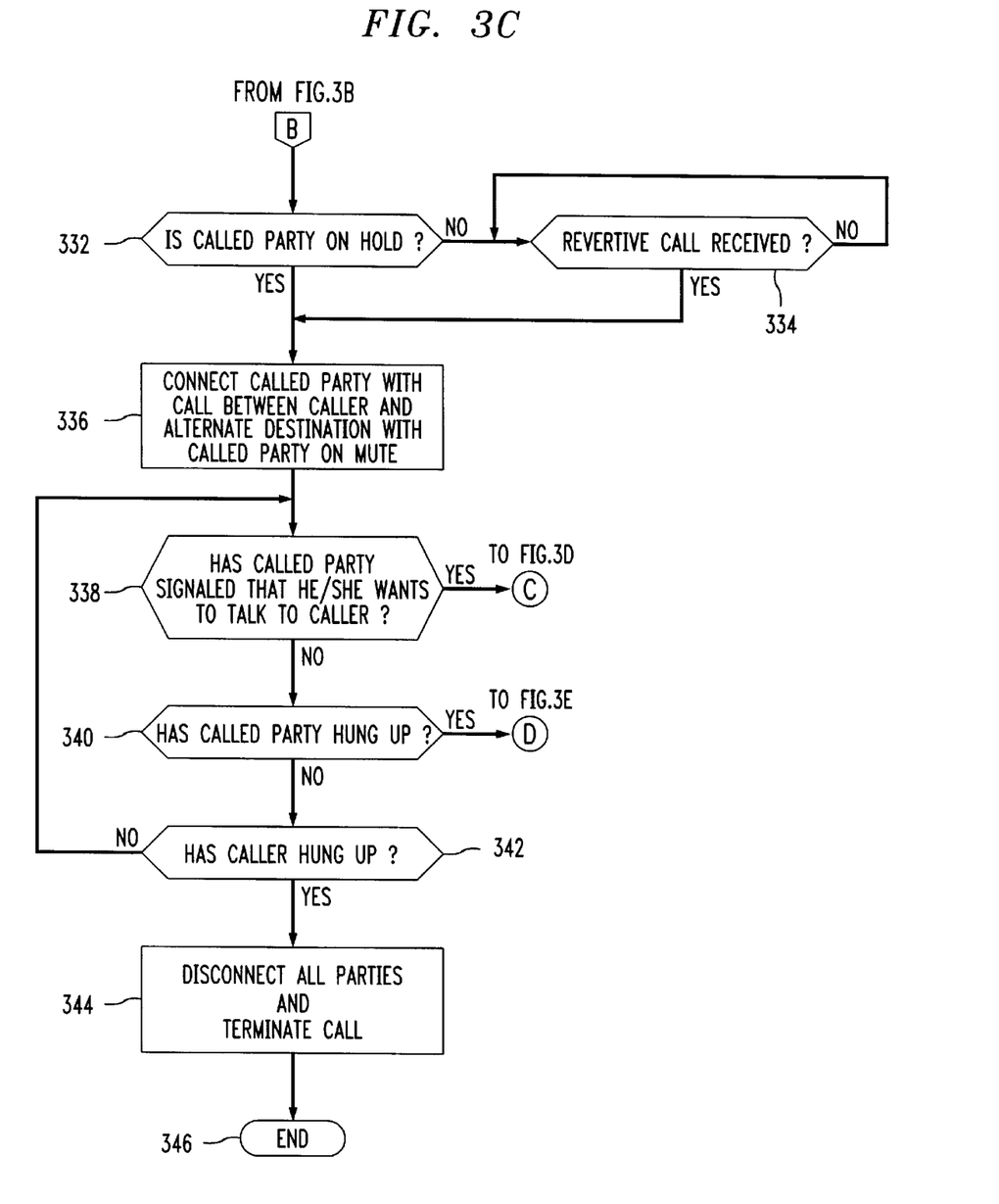

In step 332 it is determined whether the called party is on hold. If not, then in step 334 it is determined whether the revertive call has been received. If not, then step 334 is repeated until the revertive call is received. If the called party was on hold, or when the revertive call is received, control passes to step 336. In step 336, the called party is connected to the existing call between the caller and the alternate destination, with the called party's connection on mute. At this point, the caller and the alternate destination do not know that the called party has been connected, and their existing telephone call continues. The called party is now able to screen the existing call between the caller and the alternate destination and decide whether or not to take the call.

Figure 3D:
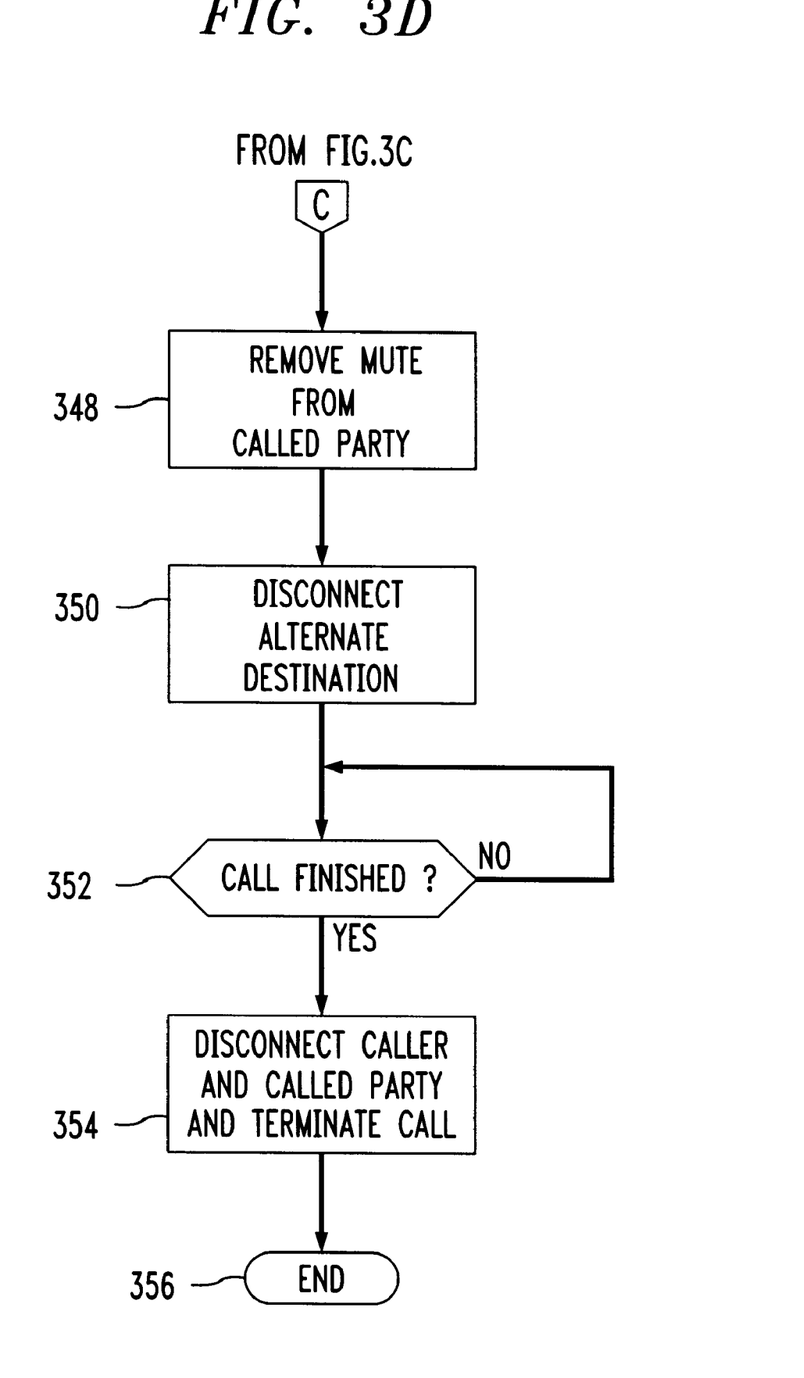

In step 338 it is determined whether the called party has signaled that he/she wishes to speak with the caller. The called party can signal such a desire by sending a DTMF tone to the bridging and signaling unit 109 by pressing a key on telephone 125. Upon receipt of such a signal, control passes to step 348. In step 348, the bridge control 405 commands the appropriate one of voice amplifier and ringback units 407 to remove the called party from mute. At this point, the caller, the alternate destination, and the called party are on a conventional 3 way conference call. In step 350, the bridge control 405 commands the switch fabric 409 to disconnect the alternate destination from the conference call. In an advantageous embodiment, prior to disconnecting the alternate destination, the bridge control may command the appropriate one of DTMF generators 411 to generate a tone which signals that the called party is now available, and that the alternate destination will now be disconnected. This feature is particularly useful when the alternate destination is a person. Once the alternate destination is disconnected, the caller and called party may converse until it is determined in step 352 that the call is finished. When the call is finished, the connection between the caller and called party is disconnected and the call is terminated in step 354. The process ends at step 356.

If the test in step 338 was "no", i.e. the called party is connected on mute but has not indicated that he/she wants to be connected, then in step 340 it is determined whether the called party has hung up. If so, then the called party is disconnected in step 358. The caller may continue the connection with the alternate destination until it is determined in step 360 that the call is finished. When the call is finished, the caller and the alternate destination are disconnected and the call is terminated in step 362. The process ends at step 364.

Figure 3E:
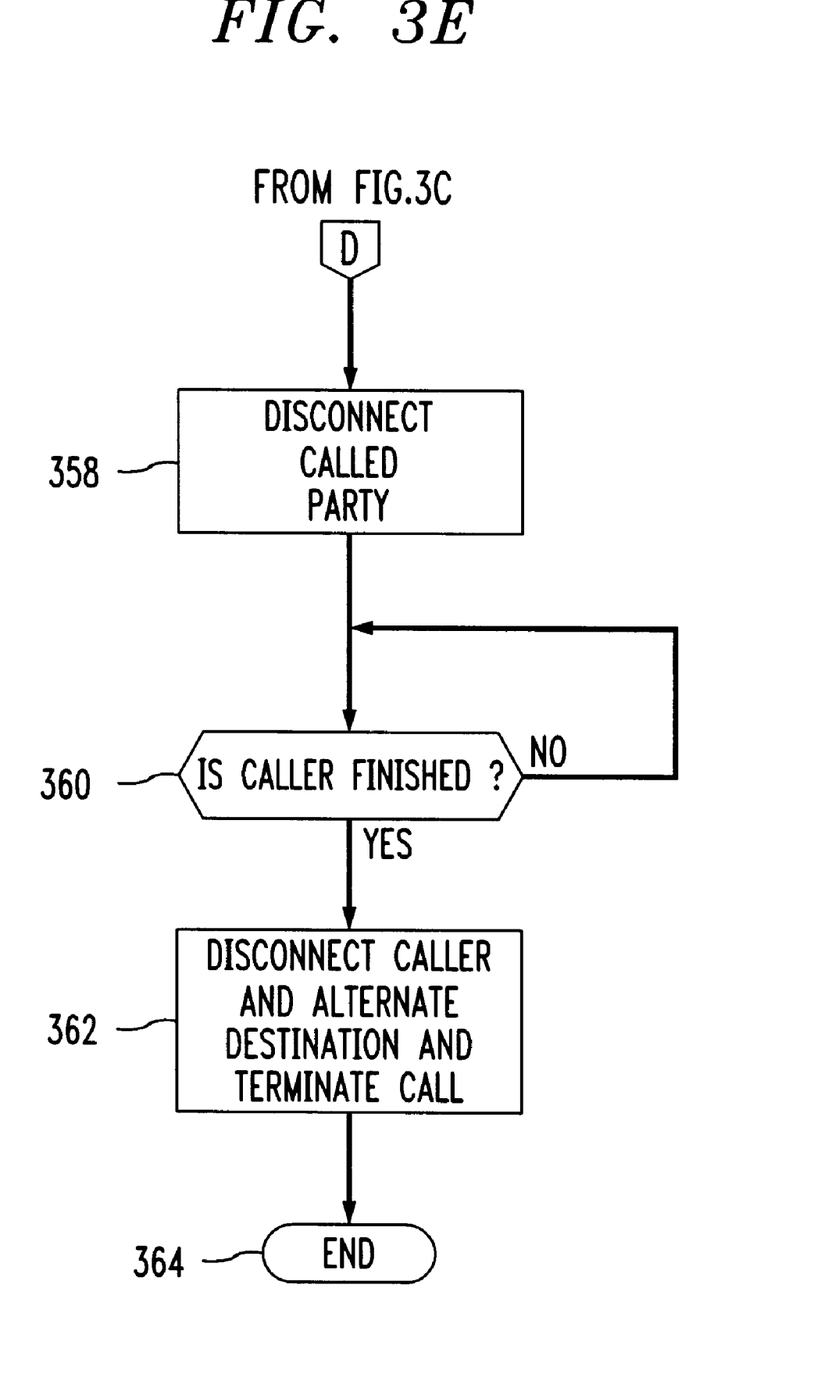

If the test in step 340 was "no", i.e. the connection with the called party and the alternate destination is continuing, then in step 342 it is determined whether the caller has hung up. If not, then control is passed to step 338, and the process repeats from step 338 as described above. If the test in step 342 is "yes", then all parties are disconnected and the call is terminated in step 344. The process ends in step 346.

In the embodiment described above, the called party is not conferenced in on mute until the caller is connected with the alternate destination. In an alternate embodiment, the called party could be connected in mute mode while the caller is on hold prior to being connected to the alternate destination. Such a modification to the process could be readily implemented by one of ordinary skill in the art given the above description.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for use in connecting an originating telephone call originated by a caller and placed to the telephone number of a called party, the method comprising the steps of:

connecting said originating telephone call to an alternate destination;

while said originating telephone call is connected to said alternate destination, receiving a return telephone call from said called party, said return telephone call being initiated from a return telephone, in response to said return telephone call, connecting said return telephone call to said originating telephone call and to said alternate destination, such that sound originating at said return telephone is not transmitted to said caller and said alternate destination, and wherein said step of connecting said originating telephone call to an alternate destination is in response to a determination that said originating telephone call cannot then be successfully connected to said called party.

2. The method of claim 1 further comprising the step of:

in response to an indication from said called party, connecting said return telephone call to said originating telephone call such that sound originating at said return telephone is transmitted to said caller.

3. The method of claim 2 further comprising the step of:

disconnecting said alternate destination from said originating telephone call and said return telephone call in response to said indication.

4. The method of claim 2 wherein said indication is a DTMF tone.

5. The method of claim 1 further comprising the step of:

in response to a termination indication from the called party, disconnecting said return telephone call from said originating telephone call and said alternate destination such that said originating telephone call remains connected to said alternate destination.

6. A method for use in completing an originating telephone call originated by a caller and placed to the telephone number of a called party, the method comprising the steps of:

connecting said originating telephone call to an intermediate destination during a first time period in which said caller is waiting to be connected to said called party;

receiving a return telephone call from said called party while said caller is connected to said intermediate destination;

in response to said return telephone call, connecting said return telephone call to said originating telephone call and said intermediate destination such that sound originating from said called party is not transmitted to said caller, and in response to a determination that a second time period has expired, further connecting said originating telephone call and said return telephone call to an alternate destination such that sound originating from said called party is not transmitted to said caller or said alternate destination.

7. The method of claim 6 further comprising the step of:

before said determination that said second time period has expired, in response to a termination indication from the called party, disconnecting the return telephone call from said originating telephone call and said intermediate destination such that said originating telephone call remains connected to said intermediate destination.

8. The method of claim 7 further comprising the step of:

connecting the originating telephone call to an alternate destination.

9. The method of claim 6 further comprising the step of:

providing automated answer supervision to the originating telephone call at the intermediate destination.

10. The method of claim 6 further comprising the steps of:

while said originating telephone call, said return telephone call, and said alternate destination are connected, receiving an indication from said called party; and in response to said indication, connecting said originating telephone call to said return telephone call such that sound originating from said called party is transmitted to said caller.

11. The method of claim 6 further comprising the steps of:

while said originating telephone call, said return telephone call, and said alternate destination are connected, receiving a termination indication from said called party; and in response to said termination indication, disconnecting the return telephone call from said originating telephone call and said alternate destination such that said originating telephone call and said alternate destination remain connected.

12. The method of claim 6 further comprising:

receiving an indication from said called party; and in response to said received indication, connecting said originating telephone call to said return telephone call such that sound originating from said called party is transmitted to said caller.

13. A method for use in completing a first telephone call originated by a caller placed to the telephone number of a called party, the method comprising the steps of:

connecting said first telephone call to an intermediate destination during the time period in which said caller is waiting to be connected to said called party;

initiating an alert to said called party;

while said caller is connected to said intermediate destination, receiving a second telephone call from the called party;

in response to receiving said second telephone call:
disconnecting said first telephone call and said intermediate destination; and
connecting said first telephone call, said second telephone call, and an alternate destination such that said second telephone call is in mute mode.

14. The method of claim 13 further comprising the step of:

receiving an indication from said called party that mute mode should be discontinued; and in response to said received indication that mute mode should be discontinued, discontinuing mute mode on said second telephone call.

15. The method of claim 14 further comprising the step of:

in response to said received indication that mute mode should be discontinued, disconnecting said alternate destination from said first and second telephone calls.

16. The method of claim 13 wherein said step of initiating an alert to said called party further comprises the step of providing paging information to a paging system.

17. An apparatus for completing a telephone call originating at a caller and placed to the telephone number of a called individual, the apparatus comprising:

a first interface for receiving a first telephone call originated by said caller, a second interface for receiving a second telephone call originated by said called individual;

a third interface for initiating a third telephone call to an alternate destination;

a switch for establishing a connection between said first telephone call, said second telephone call, and said third telephone call in response to a determination that a time period has expired; and a muting circuit connected to said second interface which, when activated, prohibits sound originating from said called individual from being transmitted to said caller and said alternate destination.

18. The apparatus of claim 17 further comprising:

a receiver for receiving an indication from said called party, wherein said switch is responsive to said indication for disconnecting said third telephone call from said first and second telephone calls and wherein said muting circuit is responsive to said indication for deactivating and allowing sound originating from said called individual to be transmitted to said caller.

19. A system for completing a telephone call from a caller to a called party, the system comprising:

means for receiving a first telephone call from said caller to said called party;

means for initiating an alert to said called party of said first telephone call;

means for connecting said first telephone call to an alternate destination;

means for receiving a second telephone call from said called party; and means for connecting said second telephone call to said first telephone call and to said alternate destination in response to a determination that a time period has expired such that sound is not transmitted from said second telephone call to said first telephone call and said alternate destination.

20. The system of claim 19 further comprising:

means for receiving an indication from said called party; and means responsive to said indication for connecting said first telephone call and said second telephone call such that sound from said second telephone call is transmitted to said first telephone call.

21. The system of claim 20 further comprising:

means responsive to said indication for terminating the connection between said first telephone call and said alternate destination and for terminating the connection between said second telephone call and said alternate destination.

* * * * *